US012202291B2

(12) United States Patent
Senne

(10) Patent No.: US 12,202,291 B2
(45) Date of Patent: Jan. 21, 2025

(54) IMAGE-PROVIDING PRINTING FORME, AND METHOD FOR PRODUCING A PRINTING FORME

(71) Applicant: ContiTech Elastomer-Beschichtungen GmbH, Hannover (DE)

(72) Inventor: Armin Senne, Ettenheim (DE)

(73) Assignee: ContiTech Elastomer-Beschichtungen GmbH, Hannover (DE)

(*) Notice: Subject to any disclaimer, the term of this patent is extended or adjusted under 35 U.S.C. 154(b) by 1084 days.

(21) Appl. No.: 16/771,843

(22) PCT Filed: Oct. 16, 2018

(86) PCT No.: PCT/EP2018/078132
§ 371 (c)(1),
(2) Date: Aug. 6, 2021

(87) PCT Pub. No.: WO2019/120679
PCT Pub. Date: Jun. 27, 2019

(65) Prior Publication Data
US 2021/0171745 A1 Jun. 10, 2021

(30) Foreign Application Priority Data
Dec. 20, 2017 (DE) .................... 10 2017 223 385.0

(51) Int. Cl.
*B41N 1/12* (2006.01)
*B41C 1/045* (2006.01)
(Continued)

(52) U.S. Cl.
CPC ................ *B41N 1/12* (2013.01); *B41F 13/11* (2013.01); *B41C 1/045* (2013.01); *B41C 1/05* (2013.01); *B41F 9/00* (2013.01)

(58) Field of Classification Search
CPC .. B41N 1/12; B41N 1/22; B41C 1/045; B41C 1/05; B41F 13/11; B41F 9/00
See application file for complete search history.

(56) References Cited

U.S. PATENT DOCUMENTS 5,257,967 A * 11/1993 Gysin ..................... B41N 7/06 492/53
7,091,028 B1 8/2006 Boehm et al.
(Continued)

FOREIGN PATENT DOCUMENTS

AT 323761 B 7/1975
CN 101139048 A 3/2008
(Continued)

OTHER PUBLICATIONS

Polymer properties database, Jan. 1, 2015, XP055538834.
International Search Report dated Jan. 14, 2019 of PCT/EP2018/078132 which this application is based on.

*Primary Examiner* — Matthew G Marini
*Assistant Examiner* — Leo T Hinze
(74) *Attorney, Agent, or Firm* — Richard A. Wolf

(57) ABSTRACT

An imaging printing form having a base body with an elastomeric coating, in which the elastomeric coating carries an engraving pattern. The elastomeric coating has a hard rubber with a hardness of greater than 40 Shore D, and more particularly greater than 70 Shore D. The hard rubber is based on butadiene-acrylonitrile rubber (NBR), carboxyl group-containing nitrile rubber (XNBR), hydrogenated acrylonitrile butadiene Rubber (HNBR) or combinations thereof.

18 Claims, 1 Drawing Sheet

Figure 1:
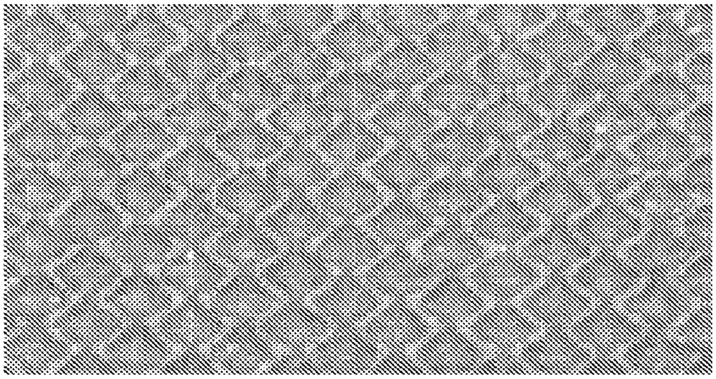

(51) Int. Cl.

| | |
|---|---|
| ***B41C 1/05*** | (2006.01) |
| ***B41F 9/00*** | (2006.01) |
| ***B41F 13/11*** | (2006.01) |

(56) References Cited

U.S. PATENT DOCUMENTS

| | | | | |
|---|---|---|---|---|
| 2003/0131743 | A1* | 7/2003 | Sauer | B41F 31/26 101/348 |
| 2011/0198323 | A1 | 8/2011 | Yamada et al. | |
| 2012/0103216 | A1 | 5/2012 | Knisel et al. | |
| 2016/0288479 | A1* | 10/2016 | Shuey | B41N 1/22 |

FOREIGN PATENT DOCUMENTS

| | | | | |
|---|---|---|---|---|
| CN | 102414027 | A | 4/2012 | |
| CN | 102729588 | A | 10/2012 | |
| CN | 203583194 | U | 5/2014 | |
| CN | 105216473 | A | 1/2016 | |
| DE | 19817104 | A1 * | 10/1999 | B41C 1/04 |
| EP | 2301759 | A1 | 3/2011 | |
| JP | 2005254696 | A | 9/2005 | |
| JP | 2009023181 | A | 2/2009 | |
| WO | 03037630 | A1 | 5/2003 | |

* cited by examiner

IMAGE-PROVIDING PRINTING FORME, AND METHOD FOR PRODUCING A PRINTING FORME

The present invention relates to an image-providing printing template comprising a base with an elastomer coating, where the elastomer coating bears an engraved pattern, characterized in that the elastomer coating comprises a hard rubber and has a hardness above 40 Shore D. The present invention moreover comprises a process for the production of an image-providing printing template, and also a process for intaglio printing.

The intaglio printing process is a printing technique in which the elements to be replicated are present as depressions (cells) in the printing template. The printing procedure comprises firstly applying ink to the entire printing template, using a doctor blade or a wiper to remove the excess ink, so that the printing ink is then present only in the depressions, and then transferring the printing ink to the paper.

A printing template can be a printing plate or an intaglio printing cylinder. However, the industrial sector places particular importance on rotary intaglio printing, in which the printing template is an intaglio printing cylinder. This process is used by way of example for the printing of periodicals or catalogues.

The image-providing (printing) surfaces of the printing template are produced in a conventional manner by first subjecting a soft copper layer with hardness of, for example, 2 on the Mohs scale to electromechanical engraving or laser engraving, and engraving the printing cells. The softness of the copper layer is necessary to permit the engraving tools used in the prior art to introduce the engraving without immediately suffering unacceptable wear. If these tools suffered excessive wear, economic conduct of this process would no longer be possible. An electroplating procedure is then used to apply a hard chromium layer with hardness of, for example, 8 on the Mohs scale, in order to protect the engraved layer from wear—caused by the doctor blade during the printing procedure.

However, this conventional process has attendant disadvantages: This process requires the application of two layers to the printing template, and is therefore comparatively complicated and energy-intensive. For the application of the chromium layer, this process moreover comprises an electroplating step that is extremely disadvantageous for reasons related to health and to the environment. Specifically, application of the hard chromium layer usually uses chromium (VI) trioxide, which is highly toxic during the application procedure until deposition has been completed. The correct disposal of chromium compounds is moreover problematic not only for reasons related to the environment but also from the point of view of costs. Because the batch sizes of printing orders are constantly decreasing, the disadvantages associated with this conventional process for the production of printing templates no longer bear any relationship to the benefits.

The present invention is therefore based on the object of providing an image-providing printing template whose production avoids the disadvantages described above of conventional processes. The present invention is moreover based on providing an appropriately improved production process.

These objects are achieved via the embodiments characterized in the claims.

In particular, an image-providing printing template is provided which comprises a base with an elastomer coating, where the elastomer coating bears an engraved pattern, characterized in that the elastomer coating comprises a hard rubber and has a hardness above 40) Shore D.

In the present invention, the printing template of the invention comprises an elastomer coating which comprises a hard rubber. This elastomer coating is hereinafter also termed hard rubber layer. In a preferred embodiment, the elastomer coating consists essentially of the hard rubber. The invention therefore provides a printing template with a printing layer which is a single hard rubber layer replacing the two layers in conventional printing templates (specifically the copper layer and the chromium layer). The base of the printing template of the invention therefore comprises the elastomer coating as single layer. The hard rubber layer permits engraving by means of the engraving techniques known in the intaglio printing industry while completely avoiding the electroplating surface treatment described in the prior art.

The hard rubber of the printing template of the invention can comprise any suitable hard rubber. It is preferable that the hard rubber is a hard rubber based on butadiene-acrylonitrile rubber (NBR), on carboxylated nitrile rubber (XNBR), on ethylene-vinyl acetate copolymer (EVAC), on ethylene-vinyl acetate rubber (EVM), on hydrogenated acrylonitrile-butadiene rubber (HNBR), on perfluoro rubber (FFKM), on ethylene-acrylate rubber (AEM), on polyacrylate rubber (ACM), on chloropolyethylene rubber (CM), on chlorosulfonyl polyethylene rubber (CSM), on ethylene-propylene-diene rubber (EPDM), on ethylene-propylene rubber (EPM), on fluoro rubber (FKM), on epichlorohydrin rubber (CO), on epichlorohydrin copolymer rubber (ECO), on propylene oxide copolymer rubber (GPO), on butadiene rubber (BR), on chloroprene rubber (CR), on isobutene-isoprene rubber (IIR), on bromobutyl rubber (BIIR), on chlorobutyl rubber (CIIR), on isoprene rubber (IR), on nitrile-butadiene rubber (NBR), on natural rubber (NR), on styrene-butadiene rubber (SBR), on fluorosilicone rubber (FVMQ), on methylphenylsilicone rubber (PMQ), on methylphenylvinylsilicone rubber (PVMQ), on methylsilicone rubber (MQ), on methylvinylsilicone rubber (VMQ), on polyester urethanes (AU), on polyether urethanes (EU) or on a combination thereof.

In a particularly preferred embodiment, the hard rubber is a hard rubber based on butadiene-acrylonitrile rubber (NBR), on ethylene-propylene-diene rubber (EPDM) or on a combination of these.

The hardness of the elastomer coating of the printing template of the invention is above 40 Shore D, preferably above 50 Shore D, particularly preferably above 70 Shore D. This hardness is determined in accordance with DIN ISO 7619-1. The hard rubber layer of the printing template of the invention therefore differs from conventional elastomers in a higher hardness (corresponding to a higher modulus of elasticity) and therefore exhibits less deformation and recovery (rubber-like elasticity).

The image-providing printing template of the invention can be any suitable printing template. It is preferable that the image-providing printing template is an intaglio printing cylinder or a printing plate. Particular preference is given here to an intaglio printing cylinder, because this is most frequently used in commercial printing. If the printing template of the invention is an intaglio printing cylinder, the base is preferably a hollow cylinder, an axial cylinder or a sleeve as cylindrical reinforcing structure. The base can be composed of any suitable material. The base can by way of example consist of plastic or of metal. In a preferred embodiment, the base consists of aluminum and/or steel. It is particularly preferable that the base is a hollow cylinder or an axial cylinder made of aluminum and/or steel.

The elastomer coating of the printing template of the invention can have any suitable thickness. It is preferable that the thickness of the elastomer coating is at least 30 μm. In a particularly preferred embodiment, the thickness of the elastomer coating is in the range of 30 μm to 30 mm. The large range of 30 μm to 30 mm permits multiple use of the printing template without fresh application of rubber. For this procedure, an engraving is simply removed by grinding after use, and a new engraving is applied.

The roughness of the elastomer coating can be adjusted in a suitable manner by grinding and polishing, for example to an average roughness depth Rz below 2 μm. In a preferred embodiment of the present invention, the average roughness depth Rz of the surface of the elastomer coating is below 1 μm. During subsequent printing, the roughness ensures that an ink film provides lubrication for the doctor blade on the surface of the printing template.

The present invention moreover provides a process for the production of an image-providing printing template, comprising (a) the provision of a base, (b) the provision of an elastomer coating on the base, and (c) the provision of an engraved pattern on the elastomer coating by engraving, characterized in that the elastomer coating comprises a hard rubber and has a hardness above 40 Shore D.

The image-providing printing template produced by means of this process can be any suitable printing template. It is preferable that the image-providing printing template is an intaglio printing cylinder or a printing plate. Particular preference is given here to an intaglio printing cylinder, because this is most frequently used in commercial printing.

In the process of the invention, a base is first provided (step (a)). If the printing template produced by the process of the invention is an intaglio printing cylinder, the base is preferably a hollow cylinder, an axial cylinder or a sleeve as cylindrical reinforcing structure. The base can be composed of any suitable material. The base can by way of example consist of plastic or of metal. In a preferred embodiment, the base consists of aluminum and/or steel. It is particularly preferable that the base is a hollow cylinder or an axial cylinder made of aluminum and/or steel.

In step (b) of the process of the invention, an elastomer coating is provided on the base. This can be achieved by conventional processes. In a preferred embodiment of the process of the invention, step (b) comprises the partial steps (b.1) the covering of the base with an elastomer or an elastomer mixture, (b.2) the vulcanization of the elastomer or the elastomer mixture with formation of the hard rubber, (b.3) the removal of excess hard rubber by a turning procedure, and (b.4) the removal of material by grinding from the surface of the elastomer coating.

The covering of the base with an elastomer or an elastomer mixture in step (b.1) can, for example, be achieved by way of a calendered sheet which is wound around the base. Alternatively, it is likewise possible that the elastomer or the elastomer mixture is extruded onto the base. This can by way of example be achieved by means of a ring extruder. It is moreover possible to cover the base by strip-covering or by a doctored application/dipping procedure from a solution of the elastomer or the elastomer mixture. The layer thickness used in the covering procedure permits achievement of the required or desired final layer thickness after vulcanization and grinding.

The elastomer, or elastomer mixture, to be applied is preferably butadiene-acrylonitrile rubber (NBR), carboxylated nitrile rubber (XNBR), ethylene-vinyl acetate copolymer (EVAC), ethylene-vinyl acetate rubber (EVM), hydrogenated acrylonitrile-butadiene rubber (HNBR), perfluororubber (FFKM), ethylene-acrylate rubber (AEM), polyacrylate rubber (ACM), chloropolyethylene rubber (CM), chlorosulfonyl polyethylene rubber (CSM), ethylene-propylene-diene rubber (EPDM), ethylene-propylene rubber (EPM), fluoro rubber (FKM), epichlorohydrin rubber (CO), epichlorohydrin copolymer rubber (ECO), propylene oxide copolymer rubber (GPO), butadiene rubber (BR), chloroprene rubber (CR), isobutene-isoprene rubber (IIR), bromobutyl rubber (BIIR), chlorobutyl rubber (CIIR), isoprene rubber (IR), nitrile-butadiene rubber (NBR), natural rubber (NR), styrene-butadiene rubber (SBR), fluorosilicone rubber (FVMQ), methylphenylsilicone rubber (PMQ), methylphenylvinylsilicone rubber (PVMQ), methylsilicone rubber (MQ), methylvinylsilicone rubber (VMQ), polyester urethanes (AU), polyether urethanes (EU) or a combination thereof.

In a particularly preferred embodiment, butadiene-acrylonitrile rubber (NBR), ethylene-propylene-diene rubber (EPDM) or a combination of these is used.

The vulcanization of the elastomer or the elastomer mixture, with formation of the hard rubber, in step (b.2) can be achieved by any conventional process. The hard rubber is obtained here by crosslinking of the elastomer or the elastomer mixture. The vulcanization can by way of example take place in an autoclave. In a preferred embodiment, the base covered with an elastomer or with an elastomer mixture can also be bandaged before vulcanization. This additional step is advantageous in respect of optimized vulcanization.

The hardness of the hard rubber obtained after vulcanization is above 40 Shore D, preferably above 50 Shore D, particularly preferably above 70 Shore D. This hardness is determined in accordance with DIN ISO 7619-1.

The removal of excess hard rubber by a turning procedure in step (b.3) can likewise be achieved by any conventional process.

The grinding of the surface of the elastomer coating in step (b.4) is preferably achieved by way of a rotary diamond-cutting device ("Polishmaster"), with the aim of thus achieving the final dimension. The elastomer coating obtained by the process of the invention can have any suitable thickness. It is preferable that the thickness of the elastomer coating after grinding is at least 30 μm. In a particularly preferred embodiment, the thickness of the elastomer coating is in the range from 30 μm to 30 mm.

The roughness of the elastomer coating can likewise be adjusted in a suitable manner by grinding, for example to an average roughness depth Rz below 2 μm. In a preferred embodiment of the present invention, the average roughness depth Rz of the surface of the elastomer coating after grinding is below 1 μm.

Another possibility is moreover additional production of a specific ground effect on the surface of the elastomer coating by way of, for example, two stone-grinding wheels. This is advantageous because this type of specific ground effect subsequently allows the printing ink to function as lubricating film between doctor blade and printing template.

However, unlike in conventional processes, this step is not essential. Because hard rubbers with hardnesses above 70 Shore D still comprise resilient components, the doctor blade achieves sealing and a clean print can be achieved, even in the absence of an additional specific ground effect on the surface.

In step (c) of the process of the invention, an engraved pattern is provided on the elastomer coating by engraving. The engraving procedure preferably uses electromechanical engraving or laser engraving.

In the case of electromechanical engraving, a diamond stylus cuts cells into the printing template. If the printing template is an intaglio printing cylinder, the diamond stylus cuts the cells into the rotating cylinder: a sliding foot can hold the stylus at a constant distance from the cylinder here. The arrangement and size of the cells determine the subsequent printed image. Electromechanical engraving produces cells with a depth of, for example, about 45 to 55 μm.

Particular preference is given to the use of laser engraving. Laser engraving produces cells with a depth of, for example, about 35 to 45 μm and, in comparison with electromechanical engraving, can therefore provide an increase of up to 75% in the speed of image-application.

In a preferred embodiment, it is also possible to carry out quality control after engraving has been completed. This quality control usually takes place before delivery, and in particular checks print-out performance, and also surface quality.

The process of the invention has a series of advantages over the conventional process for the production of a printing template. In particular, the invention avoids the electroplating process, which is disadvantageous for reasons related to costs and to the environment. The process of the invention moreover requires significantly fewer steps for the production of the printing template of the invention, because it also requires application of only one coating layer. The process of the invention moreover also offers the possibility of using existing technology. The user does not need to undertake any additional capital expenditure.

The present invention moreover provides processes for intaglio printing, comprising (a) the provision of the image-providing printing template of the invention described above, (b) the application of an ink to the surface of the printing template and (c) the transfer of the ink from the surface of the printing template to a printable substrate.

The invention will now be explained in more detail with reference to a working example.

EXAMPLE

A black-color HNBR mixture with the following properties was produced:

Color: CA.9005 RAL

Hardness: 77D Shore A

Density: 1.245 g/cm$^3$

The unvulcanized rubber mixture was provided in homogeneous form as drawn calendered sheet with thickness about 1.2 mm, and wound around a hollow aluminum cylinder. The unvulcanized rubber exhibited very little stickiness, and therefore could be wound successfully.

Vulcanization was then carried out at a temperature of 135° C. for a period of 16 hours. The material was then cooled slowly, in order to avoid separation effects.

A lathe cutter was then used for turning to an unfinished dimension of 143.39 mm. The advance rate here was restricted to 50 mm/min, and the surface temperature was monitored to ensure that this was in a range of 40 to 50 degrees Celsius.

The elastomer-coated hollow aluminum cylinder was then polished. This was achieved in two steps of fine polish to a final dimension of 143.24 mm. The average roughness depth Rz of the surface after the fine polish was below 0.6 μm.

The surface was then ground in order to adjust the average roughness depth Rz of the surface to 0.7 to provide the lubricating ink layer under the doctor blade.

The hardness of the elastomer coating was 82 Shore D.

A 120° diamond stylus was then used for electromechanical engraving. Stylus wear was continuously monitored here.

FIG. 1 shows a micrograph of the engraved surface. The quality of the cut outlines/cell edges corresponded to that of a conventional printing template with copper coating.

The intaglio printing cylinder thus produced was used in an intaglio printing test.

Figure 2:
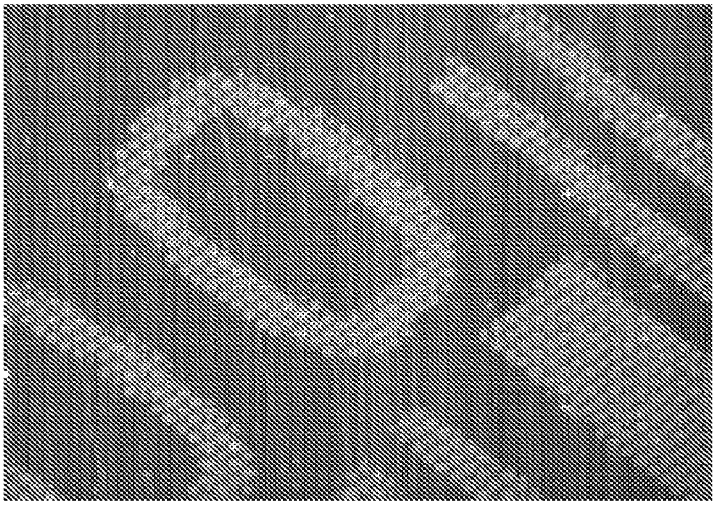

FIG. 2 shows a micrograph of the resultant print.

The ink density of the resultant print was 1.7. Toning and area coverage were satisfactory.

Finally, a wear test was carried out by printing with a Moser proofing press with soft MDC blade. The quality of the print was satisfactory up to 150 000 running meters. The requirement is only 50 000 running meters. The intaglio printing cylinder therefore exhibited low wear.

In summary, the hard-rubber-coated intaglio printing cylinder exhibited printing results just as good as those from a conventional copper-coated and hard-chromium-plated intaglio printing cylinder.

The invention claimed is:

1. A process for the production of an image-providing printing template, the process comprising:

a. the provision of a base;

b. the provision of an elastomer coating on the base; and, c. the provision of an engraved pattern on the elastomer coating by engraving;

wherein the elastomer coating comprises a hard rubber and has a hardness above 70 Shore D according to DIN ISO 7619-1, and wherein the hard rubber is based on butadiene-acrylonitrile rubber (NBR), carboxyl group-containing nitrile rubber (XNBR), hydrogenated acrylonitrile butadiene Rubber (HNBR) or combinations thereof, wherein the elastomeric coating is formed from a calendered sheet that is wound around the base, and the elastomeric coating is vulcanized by bandaging the elastomeric layer after it is applied to the base and then heating in an autoclave.

2. The process as claimed in claim 1, wherein the step b. of the provision of an elastomer coating on the base comprises the following steps:

b.1 covering of the base with an elastomer or an elastomer mixture;

b.2 vulcanization of the elastomer or the elastomer mixture with formation of the hard rubber;

b.3 removal of excess hard rubber by a turning procedure; and, b.4 removal of material by grinding from the surface of the elastomer coating.

3. The process as claimed in claim 1, wherein the engraving is achieved by an electromechanical engraving procedure which produces cells with a depth of from 45 μm to 55 μm.

4. The process as claimed in claim 1, wherein the engraving is achieved by a laser engraving procedure.

5. The process as claimed in claim 1, wherein the image-providing printing template is in the form of a gravure cylinder.

6. The process as claimed in claim 1, wherein the image-providing printing template is in the form of a printing plate.

7. The process as claimed in claim 1, wherein the base body is a hollow cylinder.

8. The process as claimed in claim 1, wherein the base body is an axle cylinder.

9. The process as claimed in claim 1, wherein the base body is a sleeve as a cylindrical strength support.

10. The process as claimed in claim 1, wherein the elastomer coating has a thickness of at least 30 microns.

11. The process as claimed in claim 1, wherein a surface of the elastomer coating has an average roughness depth of less than 1 μm Rz.

12. The process as claimed in claim 1, wherein the hard rubber is based on butadiene-acrylonitrile rubber (NBR).

13. The process as claimed in claim 1, wherein the hard rubber is based on carboxyl group-containing nitrile rubber (XNBR).

14. The process as claimed in claim 1, wherein the hard rubber is based on hydrogenated acrylonitrile butadiene rubber (HNBR).

15. The process as claimed in claim 1, wherein the hard rubber is based on a combination of butadiene-acrylonitrile rubber (NBR), carboxyl group-containing nitrile rubber (XNBR), and hydrogenated acrylonitrile butadiene rubber (HNBR).

16. The process as claimed in claim 1, wherein the engraving is achieved by a laser engraving procedure which produces cells with a depth of from 35 μm to 45 μm.

17. The process as claimed in claim 1, wherein the rubber has a hardness from above 70 Shore D to 82 Shore D.

18. The process of claim 1, wherein:

the base body is a hollow cylinder, the elastomer coating on the base is a single layer having a thickness from 30 micrometers to 30 millimeters, and a roughness of the elastomeric coating is less than 2 micrometers Rz.

* * * * *